US008509438B2

(12) United States Patent
McCullough (10) Patent No.: US 8,509,438 B2
(45) Date of Patent: Aug. 13, 2013

(54) KEY MANAGEMENT IN A WIRELESS NETWORK USING PRIMARY AND SECONDARY KEYS

(75) Inventor: Jeff D. McCullough, Raleigh, NC (US)

(73) Assignee: Elster Solutions LLC, Raleigh, NC (US)

( * ) Notice: Subject to any disclaimer, the term of this patent is extended or adjusted under 35 U.S.C. 154(b) by 681 days.

(21) Appl. No.: 12/696,724

(22) Filed: Jan. 29, 2010

(65) Prior Publication Data

US 2011/0188656 A1    Aug. 4, 2011

(51) Int. Cl.
*H04L 29/06* (2006.01)
(52) U.S. Cl.
USPC ........... 380/259; 380/273; 380/277; 713/150; 713/168; 713/171; 713/189
(58) Field of Classification Search
USPC ................. 380/259, 273, 277; 713/150, 168, 713/189
See application file for complete search history.

(56) References Cited

U.S. PATENT DOCUMENTS

| | | | | |
|---|---|---|---|---|
| 5,204,663 | A * | 4/1993 | Lee | 340/5.28 |
| 7,234,063 | B1 * | 6/2007 | Baugher et al. | 713/189 |
| 7,382,881 | B2 * | 6/2008 | Uusitalo et al. | 380/262 |
| 2008/0059792 | A1 | 3/2008 | Feder et al. | |
| 2010/0011221 | A1 * | 1/2010 | Lin et al. | 713/183 |
| 2010/0254533 | A1 | 10/2010 | McCullough | |

FOREIGN PATENT DOCUMENTS

NZ   0590368        2/2010
WO   WO 2008108764 A2 *  9/2008

OTHER PUBLICATIONS

"Security Domains: Key Management in Large-Scale Systems" by: John R. Michener, Tolga Acar; Issue Date: Sep. 1, 2000 pp. 52-58;IEEE software.*
"A Secure Key Management Scheme for Sensor Networks"; Price et al; A Secure Key Management Scheme for Sensor Networks;Proceedings of the Tenth Americas Conference on Information Systems, New York, New York, Aug. 2004; 7 pages.*
U.S. Appl. No. 12/418,787: Non-Final Rejection, dated Jan. 20, 2012, 15 pages.
U.S. Appl. No. 12/418,787: Final Rejection, dated Aug. 30, 2012, 14 pages.

* cited by examiner

*Primary Examiner* — Taghi Arani
*Assistant Examiner* — Jason Lee
(74) *Attorney, Agent, or Firm* — Woodcock Washburn LLP (57) ABSTRACT

A primary key may be used for a first attempt by a remote node to decrypt incoming messages from a master. In the event the decrypt attempt fails at the remote node, a secondary key may then be used to attempt to decrypt the message. Initially, the primary and secondary keys may be the same. A field tool, such as a hand-held programming unit operated by a technician at a remote node location, may change the secondary key, but may not cause any change to the primary key. The secondary key may remain so changed until a new primary key is verified and/or authenticated and the secondary key is overwritten with the new primary key. The primary key may only be changed/set by the master via an encrypted request. A technician may not use a field tool to change a primary key.

16 Claims, 8 Drawing Sheets

KEY MANAGEMENT IN A WIRELESS NETWORK USING PRIMARY AND SECONDARY KEYS

FIELD OF THE INVENTION

The present invention relates to communications systems, and more particularly, to encrypted transmission of data within such systems.

BACKGROUND

Encryption is often used to ensure the confidentiality of data messages exchanged in networks of wireless nodes, and key distribution is an important problem because the security of the system depends on keeping the secret keys secret. Traditional ways to handle this problem are by using symmetric ciphers to distribute the keys or to use asymmetric (public key) algorithms. Public key algorithms inherently have some attributes that make key distribution a simpler problem, but they are more computationally intensive than symmetric key algorithms. Symmetric key algorithms tend to be more efficient for resource-constrained nodes but offer no intrinsic help for the problem of key distribution. A traditional way to address key distribution without using asymmetric ciphers is to use either the old key to encrypt the new key or to use a key distribution key (some call this a "master key") to encrypt the new key. However both of these solutions have potential problems. In the first instance, if a key is compromised, i.e. learned by an unauthorized agent, then the new key is trivially also retrieved by this unauthorized party because the new key is encrypted with the old compromised key. Anyone who knows the old key can, if they are listening at the right time, also discover the new key. In the latter case, in which a key distribution key is used to encrypt the new key, the problem is similar because if the key distribution key is compromised, then all subsequent key changes are also compromised. Additionally, there is the question of how one securely changes the key distribution key.

Co-pending, commonly assigned, patent application Ser. No. 12/418,787, filed Apr. 6, 2009, titled "Simplified Secure Symmetrical Key Management," describes a key management system in which the sending cryptographic keys over a network, even in encrypted form, is avoided. As described therein, nodes of the network are each provided with a seed value and a seed identifier. Each seed value has a corresponding unique seed identifier which is maintained within the system. Within each authorized node, the seed value is combined with a local node identifier, such as a serial number or other unique identifier, to form a cryptographic key that is then used by the node to encrypt and/or decrypt data transmitted and received by that node. The cryptographic key is not transmitted over the network, and each node is able to create a different cryptographic key for use in communicating with other nodes.

A key recovery mechanism is also described in application Ser. No. 12/418,787. According to that mechanism, if a received message fails to decrypt properly at a node due to failing to have the latest seed value from which to derive the cryptographic key, the node that has received this message can securely recover from this key mismatch. The node sends the seed identifier for the seed value it presently knows. This seed identifier can be sent unencrypted. At a head end or other location of the network, a seed server receives this failure message, looks up the corresponding seed value for the received seed identifier and also the current (new) seed value and seed identifier that the node should be using. It then encrypts the new seed value and seed identifier using the old cryptographic key derived from the old seed value and sends the encrypted new seed value and identifier back to the node, so that it can update its key. The node may use its old cryptographic key to decrypt the message and recover the new seed value and new seed identifier. Thereafter, the node can generate a new cryptographic key using the new seed value and its local identifier. Receipt of the new seed value may be acknowledged by the node sending back an acknowledgement message which is encrypted using the new cryptographic key derived from the new seed value. Thus, with this key recovery mechanism, cryptographic keys may be easily updated by changing a single seed value at the seed server. The seed server then sends the encrypted new seed value and seed identifier from which each downstream node may then derive an updated unique cryptographic key value.

SUMMARY

The present application introduces the concept of "primary keys" and "secondary keys" to be used across a key management solution, like the one described in co-pending application Ser. No. 12/418,787 (it being understood that the concept may be employed in any key management system and is not limited to the one described in the co-pending application). As used herein, the term "primary key" describes a key managed by a key master, such as a head-end security key application or master device in the system hierarchy. The primary key may be used for a first attempt by a remote node to decrypt incoming messages from the master. In the event the decrypt attempt fails at the remote node, the "secondary key" may then be used to attempt to decrypt the message. In one embodiment, in normal operation, the primary and secondary keys may be the same, until such point one is changed. For example, the master may change the primary key, and the secondary key may remain until the new primary key has been verified and/or authenticated back to the master; at that point, the secondary key may also be changed to again be the same as the primary key.

In one embodiment, a field tool (such as a hand-held programming unit operated by a technician at a remote node location) may change the secondary key, but may not cause any change to the primary key. The secondary key may remain so changed until a new primary key is verified and/or authenticated and the secondary key is overwritten with the new primary key. In an embodiment, the primary key may only be changed/set by the master via an encrypted request. In that embodiment, a technician cannot use a field tool to change/set a primary key.

By providing the field tool (operated by a technician) the ability to set/change the secondary key on the remote node, secure communications may be re-established between the master and the remote node in the event that the primary key fails to provide successful decryption of information transmitted to the remote node. Once secure communications are reestablished using the secondary key, then the normal key recovery process of the system can be used to update the primary key remotely (encrypted), thereby allowing re-alignment of the primary key between the master and the remote node.

Other features are described below.

BRIEF DESCRIPTION OF THE DRAWINGS

The foregoing summary, as well as the following detailed description, is better understood when read in conjunction with the appended drawings. In the drawings.

DETAILED DESCRIPTION

The systems and methods described herein may be embodied in a variety of different types of networks in which communications among nodes are encrypted. One example of a network in which the systems and methods described herein may be embodied is a metering system.

Exemplary Metering System

Figure 1:
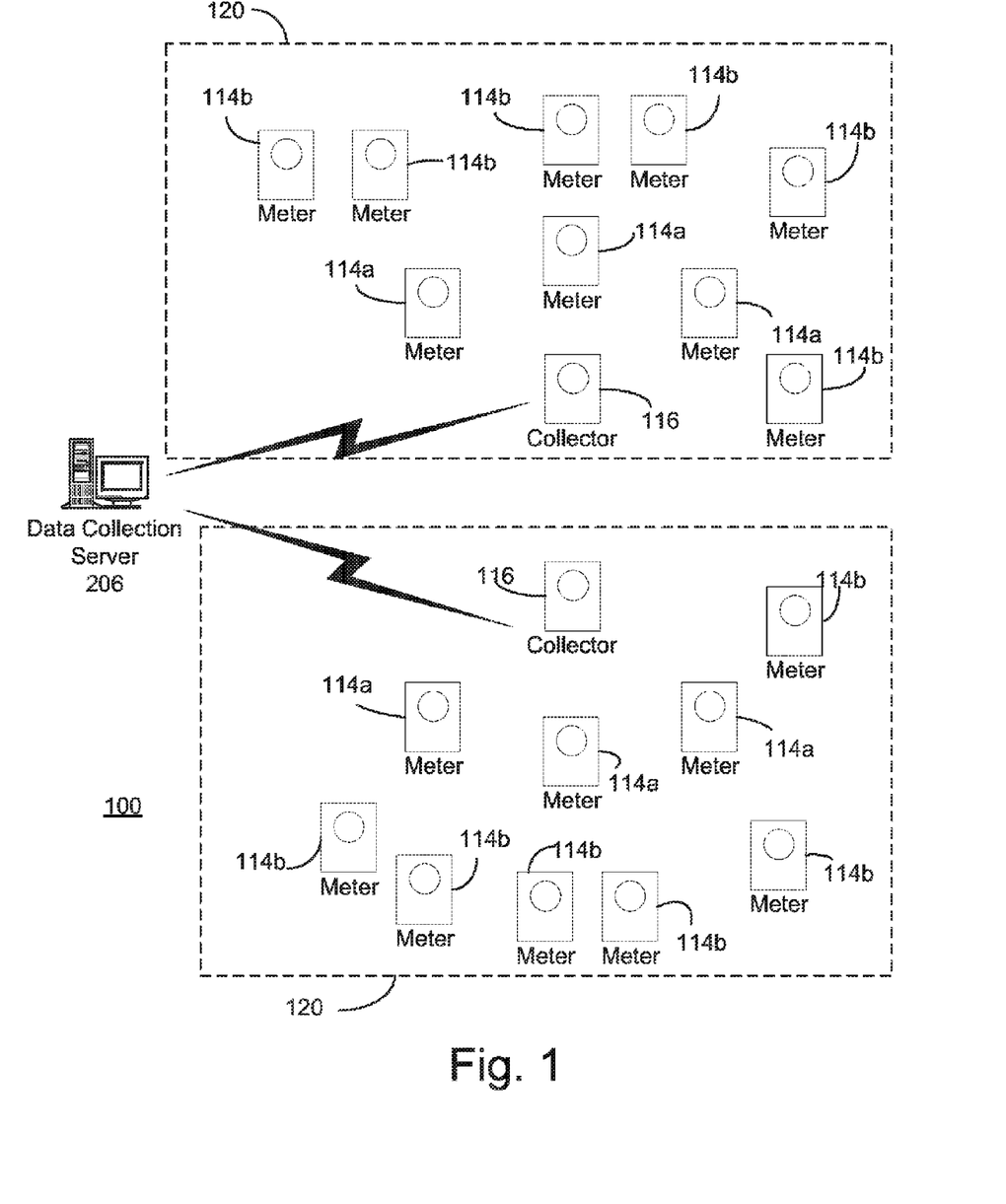
FIG. 1 is a diagram of an exemplary wireless metering system in which a key management system may be employed.

FIG. 1 is a diagram of an exemplary metering system 100. Generally, a plurality of meters 114, which operate to track usage of a service or commodity such as, for example, electricity, water, or gas, wirelessly communicate with each other, forming a wireless network. Each meter defines a node on the wireless network. One or more of these nodes (e.g., nodes 116), which may be referred to as "collectors," may serve to collect data transmitted by other nodes and to forward that data to a data collection server 206.

Meters 114 may be located at customer premises such as, for example, a home or place of business. Meters 114 may comprise a wireless communications interface and an antenna and are operable to transmit data, including service or commodity usage data, wirelessly. Meters 114 may be operable to receive data wirelessly as well.

Collectors 116 also may comprise a wireless communications interface and an antenna and are operable to send data to and receive data from meters 114 wirelessly. Collectors 116 may also be meters operable to detect and record usage of a service or commodity such as, for example, electricity, water, or gas. Alternatively, collectors 116 may perform a data collection and forwarding function without also operating as meters themselves.

A collector 116 and the meters 114 with which it communicates to receive commodity usage data may define a subnet/LAN 120 of system 110. Meters 114 and collectors 116 may be considered as nodes in the subnet 120. For each subnet/LAN 120, data may be collected at collector 116 and periodically transmitted to the data collection server 206. The data collection server 206 stores the data for analysis and preparation of billing information. The data collection server 206 may be a specially programmed general purpose computing system and may communicate with collectors 116 wirelessly or via a wire line connection such as, for example, a dial-up telephone connection or fixed wire network.

Generally, collectors 116 and meters 114 communicate with and amongst one another using any one of several robust wireless techniques such as, for example, frequency hopping spread spectrum (FHSS) and direct sequence spread spectrum (DSSS). Any of a variety of communications protocols may be employed. As illustrated in FIG. 1, meters 114a may be "first level" meters that communicate directly with a collector 116, whereas meters 114b may be higher "level" meters that communicate indirectly with the collector 116 through one or more intermediate nodes 114 that serve as repeaters. A "first level" meter 114 that communicates directly with a collector is said to be "1 hop" away from the collector, and a meter that communicates with the collector via one other meter that servers as a repeater is said to be "2 hops" away from the collector. Meters may be more "hops" away. For example, a meter could be as many as 8 hops away from a collector.

Figure 2:
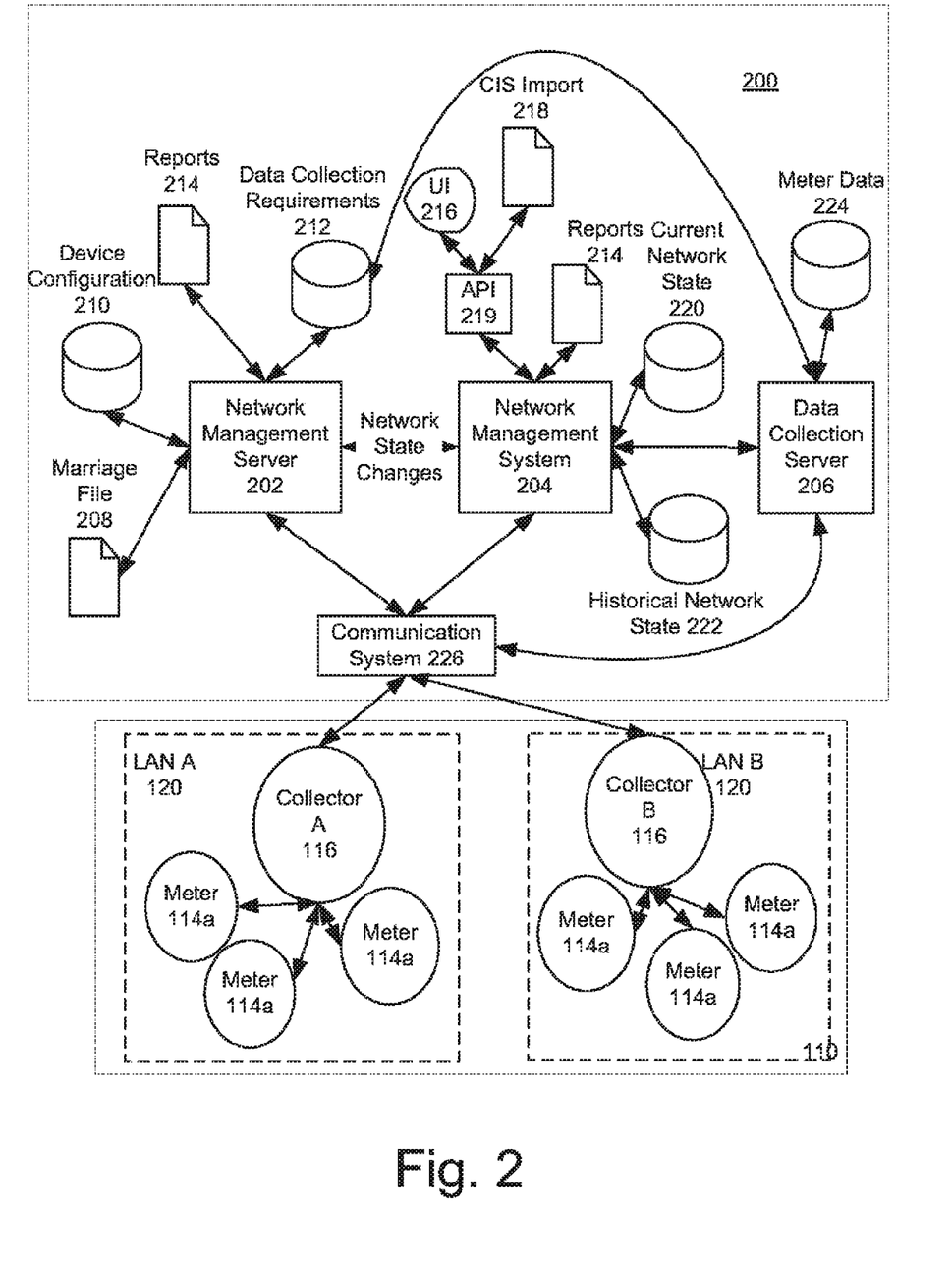
FIG. 2 expands upon the diagram of FIG. 1 and provides further details.

Referring now to FIG. 2, further details of the metering system 100 are shown. A head-end 200 of the system includes a network management server 202, a network management system (NMS) 204 and a data collection server 206 that together manage one or more subnets/LANs 120 and their constituent nodes. The NMS 204 tracks changes in network state, such as new nodes registering/unregistering with the system, node communication paths changing, etc. This information is collected for each subnet/LAN 120 and is forwarded to the network management server 202 and data collection server 206.

Each meter 114 in a given subnet has a unique LAN identifier associated with it that is stored in the meter. A marriage file 208 may be used to correlate the LAN identifier of each meter with another serial number or identifier that, for example, a utility operating the head-end 200 may wish to use to identify the meters. A device configuration database 210 stores configuration information regarding the meters. For example, in the metering system 100, the device configuration database may include data regarding time of use (TOU) switchpoints, etc. for the meters 114a and collectors 116 communicating to the head-end 200. A data collection requirements database 212 may contain information regarding the data to be collected on a per node basis. For example, a user may specify that metering data such as load profile, demand, TOU, etc. is to be collected from particular meter(s) 114a. Reports 214 containing information on the network configuration may be automatically generated or in accordance with a user request.

The network management system (NMS) 204 maintains a database describing the current state of the global fixed network system (current network state 220) and a database describing the historical state of the system (historical network state 222). The current network state 220 contains data regarding current meter to collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 219 that is exposed to a user interface 216 and a Customer Information System (CIS) 218. Other external interfaces may also be implemented. In addition, the data collection requirements stored in the database 212 may be set via the user interface 216 or CIS 218.

The data collection server 206 collects data from the nodes (e.g., collectors 116) and stores the data in a database 224. The data includes metering information, such as commodity usage data and may be used for billing purposes, etc. by a utility provider.

The network management server 202, network management system 204 and data collection server 206 communicate with the nodes in each subnet/LAN 120 via a communication system 226. The communication system 226 may be a Wide Area Network (WAN) and may comprise a Frequency Hopping Spread Spectrum radio network, a mesh network, a Wi-Fi (IEEE 802.11) network, a Wi-Max (IEEE 802.16) network, a land line (POTS) network, etc., or any combination of the above and enables the head end 200 to communicate with the meters.

Exemplary Key Management

Figure 3:
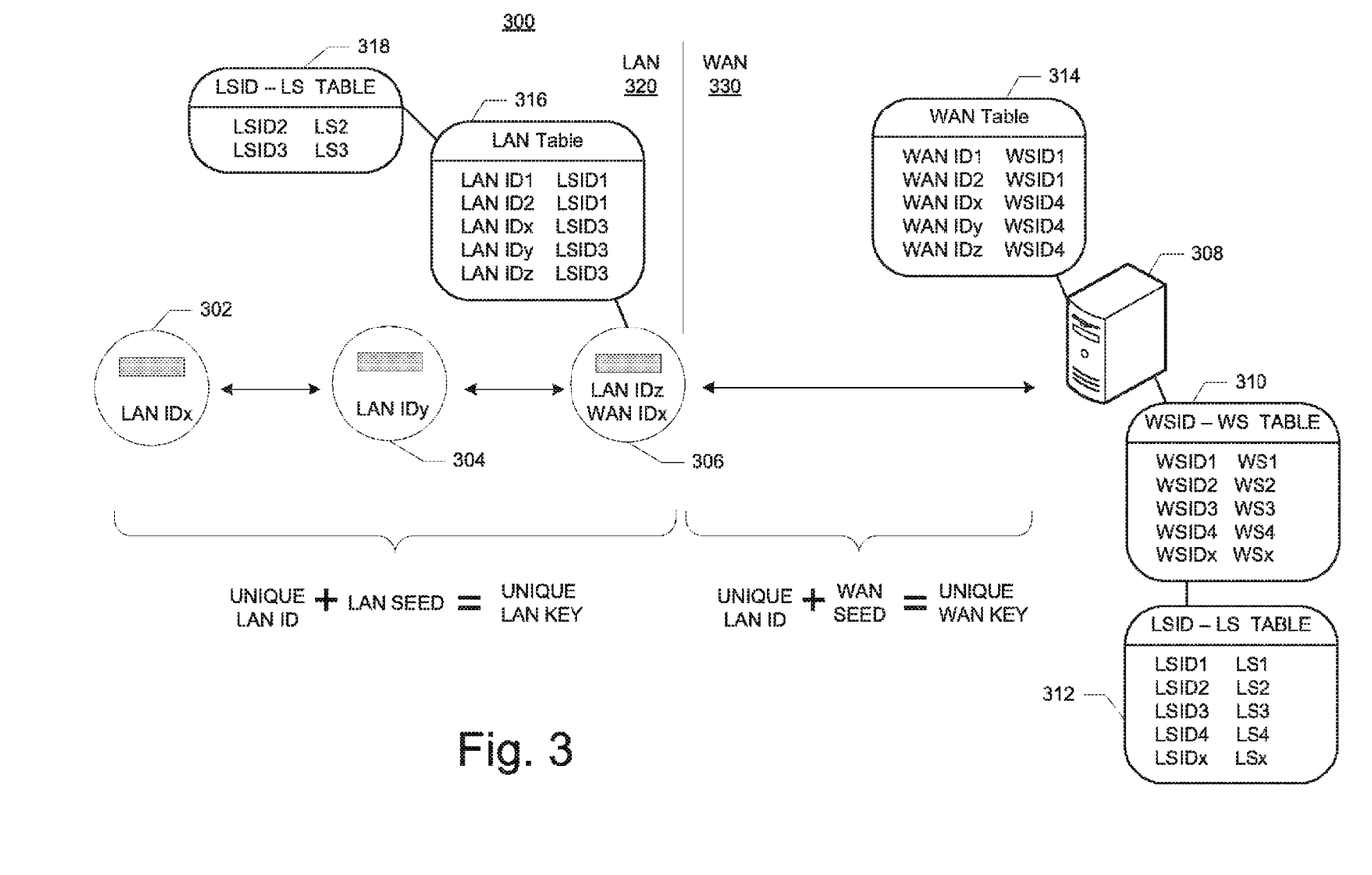
FIG. 3 is a diagram illustrating one embodiment of an exemplary key management system.

As described in co-pending application Ser. No. 12/418,787, a system like the one illustrated in FIGS. 1 and 2 may employ a key management system to manage keys used to provided secure, i.e., encrypted, communications among the nodes of the system. FIG. 3 is a block diagram of one embodiment of a secure symmetrical key management system. This exemplary key management system is described in co-pending application Ser. No. 12/418,787. As shown, the system comprises a plurality of nodes (e.g., nodes 302, 304, 306 . . . ) forming a local area network (LAN) 320. In one embodiment, each node 302, 304, 306 may be a meter, such as a meter 114 of the metering system shown in FIGS. 1 and 2. However, the invention is by no means limited to implementation in such a metering system.

At least one of the nodes, such as node 306, may be in communication with a server 308. For ease of description only, the node 306 may be referred to herein as a "master" node, however that label should not be construed as limiting or descriptive of the functionality of node 306 other than to identify it as a node that is in communication with the server 308. The master node 306 and the server 308 may communicate over any suitable medium, including the LAN 320 or, as shown in FIG. 3, a wide area network (WAN) 330, or any other suitable communication medium.

In the embodiment shown, each of the other nodes (e.g., 302, 304 . . . ) may have a wireless communication path to the master node 306 that is either a direct path or an indirect path through one or more intermediate nodes that serve as repeaters. For example, while node 304 may be able to communicate directly with the master node 306, node 302 may have its communications forwarded to the master node 306 via node 304. The LAN 320 may comprise any number of nodes. In one embodiment, the LAN may comprise thousands of nodes. In one embodiment, the nodes may transmit information in packets using any suitable form of addressing.

The server 308 may comprise a general purpose computer system that is programmed to perform the functions described below, or alternatively, the server 308 may comprise a special-purpose computing device designed to perform the functions described below. The server 308 maintains a plurality of seed values, each of which has a corresponding seed identifier that uniquely identifies that seed value. For example, the server 308 may maintain a table 312 that stores seed values LS1, LS2, LS3 . . . LSx, each associated with a respective seed identifier LSID1, LSID2, LSID3 . . . LSIDx. The server 308 may also maintain another table 310 that stores additional seed values WS1, WS2, WS3 . . . WSx and associated seed identifiers WSID1, WSID2, WSID3 . . . WSIDx. In one embodiment, each seed value may comprise a unique 64-bit value, and each seed identifier may comprise an 8-bit value. However, in other embodiments, each seed value and seed identifier may comprise more or less bits. In the embodiment shown, the seed values in table 312 are employed in communications between nodes of the LAN 320 and the master node 306, and the seed values in table 310 are employed in communications over the WAN 330 between the master nodes (e.g., node 306) and the server 308.

In the embodiment illustrated in FIG. 3, each node 302, 304, 306 of the LAN 320 stores (i) a LAN identifier (e.g., LAN IDx, LAN IDy . . . LAN IDz) that uniquely identifies that node on the network, (ii) one of the plurality of seed values (e.g., LS1, LS2 . . . LSx), and (iii) the identifier corresponding to the seed value (e.g., LSID1, LSID2 . . . LSIDx). When communicating with the master node 306, each other node (e.g., 302, 304) generates a unique cryptographic key (LK) based at least in part on a combination of its LAN identifier (LAN ID) and its stored seed value (LS) and uses the unique cryptographic key to encrypt information (e.g., packets) transmitted to the master node 306. In one embodiment, each of the nodes 302, 304 is provided with the same seed value, which may be updated from time to time. However, in other embodiments, individual nodes or groups of nodes may be provided with different seed values.

In one embodiment, each node generates its unique cryptographic key (LK) by inputting its LAN identifier (LAN ID) and stored seed value (LS) to a mathematical function that generates the cryptographic key (LK) as an output of the function. In one embodiment, the mathematical function may comprise a cryptographic algorithm, such as, for example, the Advanced Encryption Standard (AES) algorithm or the Data Encryption Standard (DES) algorithm. However, any other suitable encryption algorithm or mathematical function may be employed. For example, the mathematical function may comprise any suitable one-way function, hash function, or the like.

As further shown, the master node 306 may maintain a table 316 that stores, for each node on the LAN 320, that node's LAN ID and the corresponding seed identifier for the seed value presently being used by that node to generate the node's unique encryption key. The master node 306 may also maintain a table 318 containing at least some of the seed values maintained by the server 308 together with their respective identifiers. With this information, the master node 306 can use the same mathematical function as the other nodes to recreate, as needed, the unique cryptographic key used by each of the other nodes in order to decrypt information received from each node. In this manner, symmetrical key encryption can be employed within the network without the need to distribute unique cryptographic keys to each node.

In the embodiment shown in FIG. 3, the master node 306 has both a LAN identifier (LAN ID) that uniquely identifies the master node 306 on the LAN 320 and a WAN identifier (WAN ID) that uniquely identifies the master node 306 on the WAN 330. The master node 306 may further store (i) one of the plurality of seed values (e.g., WS1, WS2 . . . WSx) used for communications on the WAN, and (ii) the seed identifier corresponding to the WAN seed value (e.g., WSID1, WSID2 . . . WSIDx). When communicating with the server 308, the master node 306 (and each other master node if there are plural master nodes) generates a unique cryptographic key (WK) based at least in part on a combination of its WAN identifier (WAN ID) and its stored WAN seed value (WS) and uses the unique cryptographic key to encrypt information (e.g., packets) transmitted to the server 308 over the WAN 330. As with the other nodes of the LAN 320, the master node 306 may use any suitable mathematical function or cryptographic algorithm to generate its unique cryptographic key (WK) from its WAN identifier and WAN seed value.

In one embodiment, each master node (e.g., node 306) is provided with the same WAN seed value, which may be updated from time to time. However, in other embodiments, individual master nodes or groups of master nodes may be provided with different WAN seed values. The server 308 may maintain another table 314 that associates the WAN ID of each master node with the seed identifier (e.g., WSID) of the WAN seed value presently stored by that master node. With this information, the server 308 can recreate, as needed, the unique cryptographic key (WK) used by each of the master nodes in order to decrypt information received from each master node via the WAN 330. Again, in this manner, symmetrical key encryption can be employed across the WAN without the need to distribute unique cryptographic keys to each node.

While in the embodiment shown in FIG. 3, different seed values (WS) are used for communications on the WAN than the seed values (LS) used for communications on the LAN, in other embodiments, the same seed values could be employed on both. Alternatively, there may be no WAN and the server 308 could be another node on the LAN 320. In yet other embodiments, there may be no WAN and the functionality of the server 308 may be incorporated into the master node(s) (e.g., node 306). Additionally, while the system of FIG. 3 can be viewed as forming a hierarchy with the seed server 308 and master node 306 at a top level serving the other nodes 302, 304 at a lower level, the key management system and method described herein can be extended to multiple other levels where, for example, one of the nodes 302, 304 may serve as a master node for another group of nodes beneath it in the hierarchy.

Figure 4:
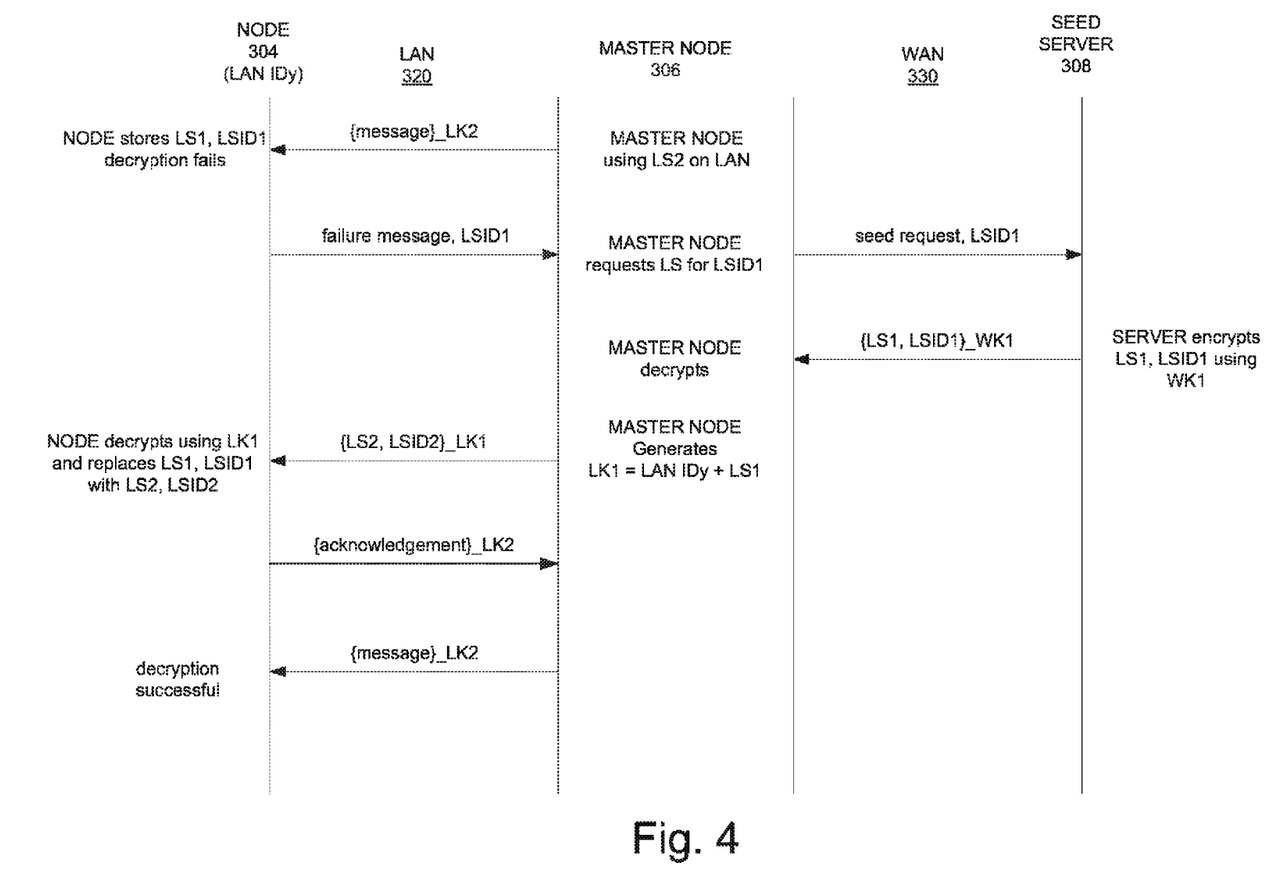
FIG. 4 is a diagram illustrating one embodiment of a method for key recovery in the system of FIG. 3.

FIG. 4 is a diagram illustrating one embodiment of a key recovery method that may be employed to enable a node to obtain a new seed value in the event that it is unable to decrypt an encrypted message or packet of information received from the master node 306. For purposes of illustration, and with reference also to FIG. 3, assume that the master node 306 is presently using seed value LS2 to generate cryptographic keys for communicating with the nodes of the LAN 320. For example, when encrypting a message to node 304, the master node 306 will generate a cryptographic key (LK2) by combining the LAN identifier of node 304 (LAN IDy) with seed value LS2. As used in the drawings, the notation "{message}_LK2" in FIG. 4 indicates that the "message" within the brackets "{ }" is encrypted using key "LK2."

The encrypted message is then transmitted to node 304. Assume, however, that node 304 presently stores (and uses for generating its cryptographic key) seed value LS1 and its seed identifier LSID1. Node 304 will generate its unique encryption key (LK1) by combining its LAN IDy with LS1. Decryption will fail because LK1 will not match LK2, since different seed values were used to generate them.

As a result of the failure, node 304 may send a failure notification to the master node 306, which includes the seed identifier LSID1 for the seed value LS1 presently being used by the node 304. The seed value itself is not transmitted. Assuming that the master node 306 does not already have the seed value for seed identifier LSID1 in its table 318, the master node 306 will send a seed request to the seed server 308 that includes the seed identifier LSID1.

Assuming that the master node 306 and the server 308 are using WAN seed value WS1 (and associated identifier WSID1) for communications over the WAN, the server will send the seed value LS1 for seed identifier LSID1 back to the master node 306 encrypted using a cryptographic key (WK1) generated by combining the WAN identifier (WAN IDx) of the master node with WAN seed value WS1. The master node 306 will decrypt the message to recover the LAN seed value LS1 and will store it in its table 318 associated with its respective seed identifier LSID1.

The master node 306 is then able to generate the cryptographic key LK1 used by node 304 by combining the LAN identifier (LAN IDy) of node 304 with LS1. The master node then uses that cryptographic key LK1 to encrypt the seed value LS2 and seed identifier LSID2 and to transmit the encrypted seed value LS2 and seed identifier LSID2 to the node 304. The node 304 is able to decrypt the message using LK1 and then updates its seed value and seed identifier to the newly received values LS2 and LSID2. With the new seed value LS2, the node 304 is able to generate a new cryptographic key LK2 that can be used to encrypt/decrypt future messages to/from the master node 306 and vice versa. The node 304 may send an acknowledgement back to the master node 306, as shown. The master node may then resend the original message encrypted with LK2 ("{message}_LK2"), which the node 304 will be able to decrypt successfully.

As the method of FIG. 4 illustrates, cryptographic keys can be updated in the LAN or WAN without the need to transmit those keys across the network. The seed identifiers may be transmitted over the network in the clear, without revealing either the seed values or the cryptographic keys.

Figure 5:
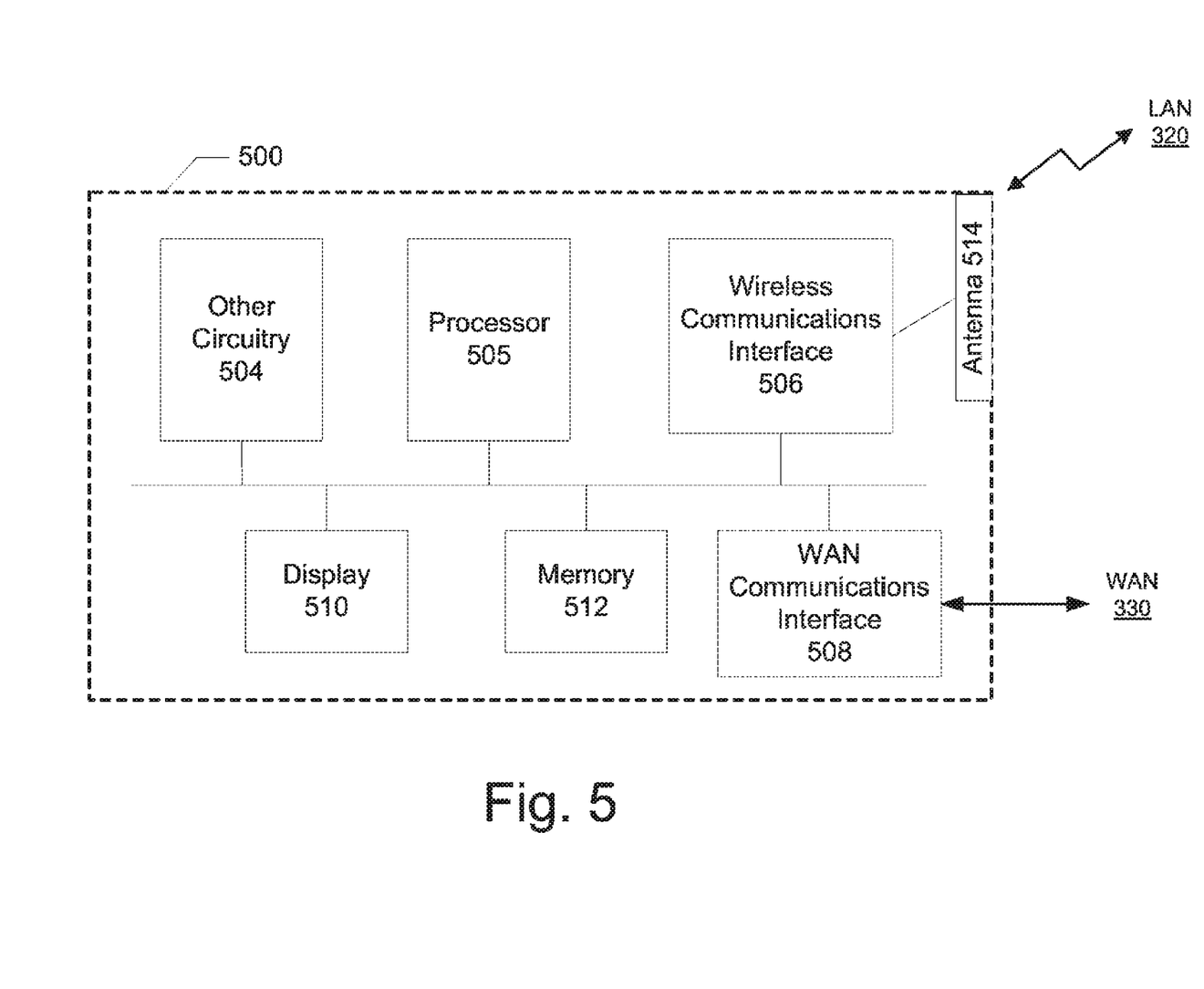
FIG. 5 is a block diagram of one example embodiment of a node of the system illustrated in FIG. 3.

FIG. 5 is a diagram illustrating one embodiment of a node 500 that may be used to implement any one of the nodes 302, 304 . . . 306 of the LAN 320 of FIG. 3. The node 500 may, for example, be one of the meters 114 illustrated in FIGS. 1 and 2. As shown in FIG. 5, the node 500 may comprise a central processing unit or processor 505, such as a microprocessor, microcontroller or the like, a memory 512 in which to store data, and a display 510. The node 500 may also include other circuitry 504 specific to its particular function. For example, where the node 500 is a meter, such as one of the meters 114 of FIGS. 1 and 2, the other circuitry 504 may comprise metering circuitry. The node 500 may further comprise a wireless communications interface 506 and an antenna 514 for communicating wirelessly with other nodes on the LAN 320. As one example, the wireless communications interface may comprise a CC1110 chip available from Texas Instruments, Inc.

In the case of a node, such as node 306, that serves as a master node, the node may also include a WAN communications interface 508 for communicating over the WAN 330 with, for example, the seed server 308. The WAN communications interface 508 may comprise any suitable circuitry for communicating over the particular WAN employed, such as wireless communications circuitry, circuitry that implements a network protocol such as Ethernet, a telephone modem, or the like.

Figure 6:
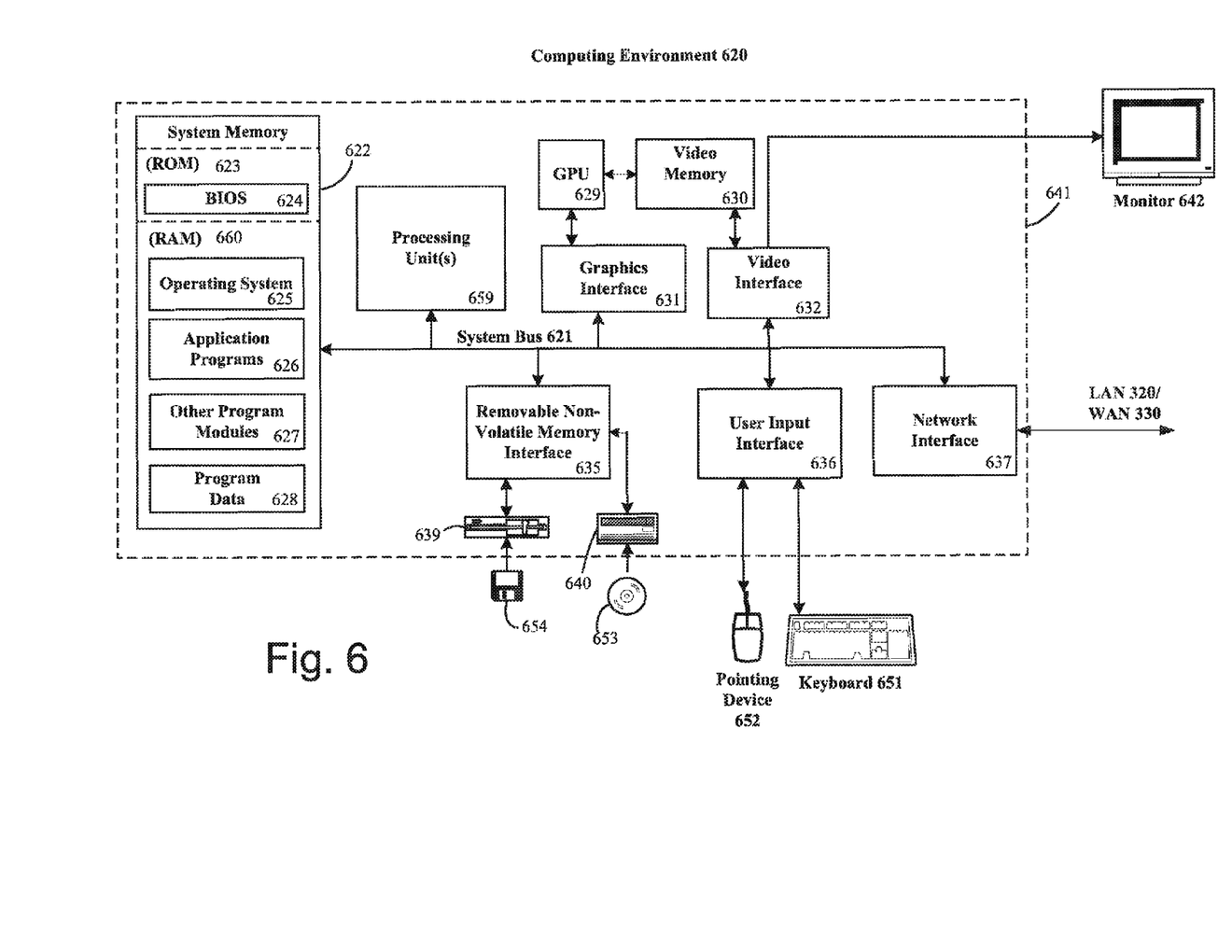
FIG. 6 is a block diagram of an example computing environment that may be used to implement either a node or the server illustrated in FIG. 3.

FIG. 6 is an example embodiment of a computing environment 620 that may also be used to implement one or more of the nodes 302, 304 . . . 306 or the server 308 of FIG. 3. The computing environment 620 is only one example of a suitable computing environment and is not intended to suggest any limitation as to the scope of use or functionality of the presently disclosed subject matter. Neither should the computing environment 620 be interpreted as having any dependency or requirement relating to any one or combination of components illustrated in FIG. 6. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since the state of the art has evolved to a point where there is little difference between hardware, software, or a combination of hardware/software, the selection of hardware versus software to effectuate specific functions is a design choice left to an implementer. More specifically, a software process can be transformed into an equivalent hardware structure, and a hardware structure can itself be transformed into an equivalent software process. Thus, the selection of a hardware implementation versus a software implementation is one of design choice and left to the implementer.

In FIG. 6, the computing environment 620 comprises a computer 641, which typically includes a variety of computer readable media. Computer readable media can be any available media that can be accessed by computer 641 and includes both volatile and nonvolatile media, removable and non-removable media. The system memory 622 includes computer storage media in the form of volatile and/or nonvolatile memory such as read only memory (ROM) 623 and random access memory (RAM) 660. A basic input/output system 624 (BIOS), containing the basic routines that help to transfer information between elements within computer 641, such as during start-up, is typically stored in ROM 623. RAM 660 typically contains data and/or program modules that are immediately accessible to and/or presently being operated on by processing unit 659. By way of example, and not limitation, FIG. 6 illustrates operating system 625, application programs 626, other program modules 627, and program data 628.

The computer 641 may also include other removable/non-removable, volatile/nonvolatile computer storage media. By way of example only, the computer 641 may include a hard disk drive (not shown) that reads from or writes to non-removable, nonvolatile magnetic media, a magnetic disk drive 639 that reads from or writes to a removable, nonvolatile magnetic disk 654, and an optical disk drive 640 that reads from or writes to a removable, nonvolatile optical disk 653 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Magnetic disk drive 639 and optical disk drive 640 are typically connected to the system bus 621 by a removable memory interface, such as interface 635. The drives and their associated computer storage media discussed above and illustrated in FIG. 6, provide storage of computer readable instructions, data structures, program modules and other data for the computer 641.

A user may enter commands and information into the computer 641 through input devices such as a keyboard 651 and pointing device 652, commonly referred to as a mouse, trackball or touch pad. Other input devices (not shown) may include a microphone, joystick, game pad, satellite dish, scanner, or the like. These and other input devices are often connected to the processing unit 659 through a user input interface 636 that is coupled to the system bus, but may be connected by other interface and bus structures, such as a parallel port, game port or a universal serial bus (USB). The computer may connect to a local area network or wide area network, such as LAN 320 and/or WAN 330, through a network interface or adapter 637.

Primary and Secondary Keys

The present invention is directed to the use of "primary keys" and "secondary keys" in a secure (encrypted) communications system that employs a key management system. One example of such a communications system is described above and illustrated in FIGS. 1 and 2, and an example key management system is described and illustrated above in FIGS. 3-6. For purposes of understanding and explanation only, methods and apparatus employing "primary keys" and "secondary keys" in accordance with the present invention are described below as implemented in the exemplary systems of FIGS. 1-6. However, it is understood that the present invention is not so limited, but rather may be employed in any communications system that uses encryption keys to provide secure communications and that provide a key management system to manage the distribution and control of such encryption keys.

As used herein, the term "primary key" describes a key managed by a key master, such as a head-end security key application or master device in the system hierarchy. One example of such a key master is the server 308 depicted in FIG. 3. As described hereinafter in greater detail, the primary key may be used for a first attempt by a node to decrypt incoming messages from the master. In the event the decrypt attempt fails at the remote node, the "secondary key" may then be used to attempt to decrypt the message. In one embodiment, in normal operation, the primary and secondary keys may be the same, until such point one is changed. For example, the master may change the primary key, and the secondary key may remain until the new primary key has been verified and/or authenticated back to the master; at that point, the secondary key may also be changed to again be the same as the primary key.

In one embodiment, a field tool (such as a hand-held programming unit operated by a technician at a remote node location) may change the secondary key, but may not cause any change to the primary key. The secondary key may remain so changed until a new primary key is verified and/or authenticated and the secondary key is overwritten with the new primary key. In an embodiment, the primary key may only be changed/set by the master via an encrypted request. In that embodiment, a technician cannot use a field tool to change/set a primary key.

By providing the field tool (operated by a technician) the ability to set/change the secondary key on the remote node, secure communications may be re-established between the master and the remote node in the event that the primary key fails to provide successful decryption of information transmitted to the remote node. Once secure communications are reestablished using the secondary key, then the normal key recovery process of the system can be used to update the primary key remotely (encrypted), thereby allowing re-alignment of the primary key between the master and the remote node.

Figure 7:
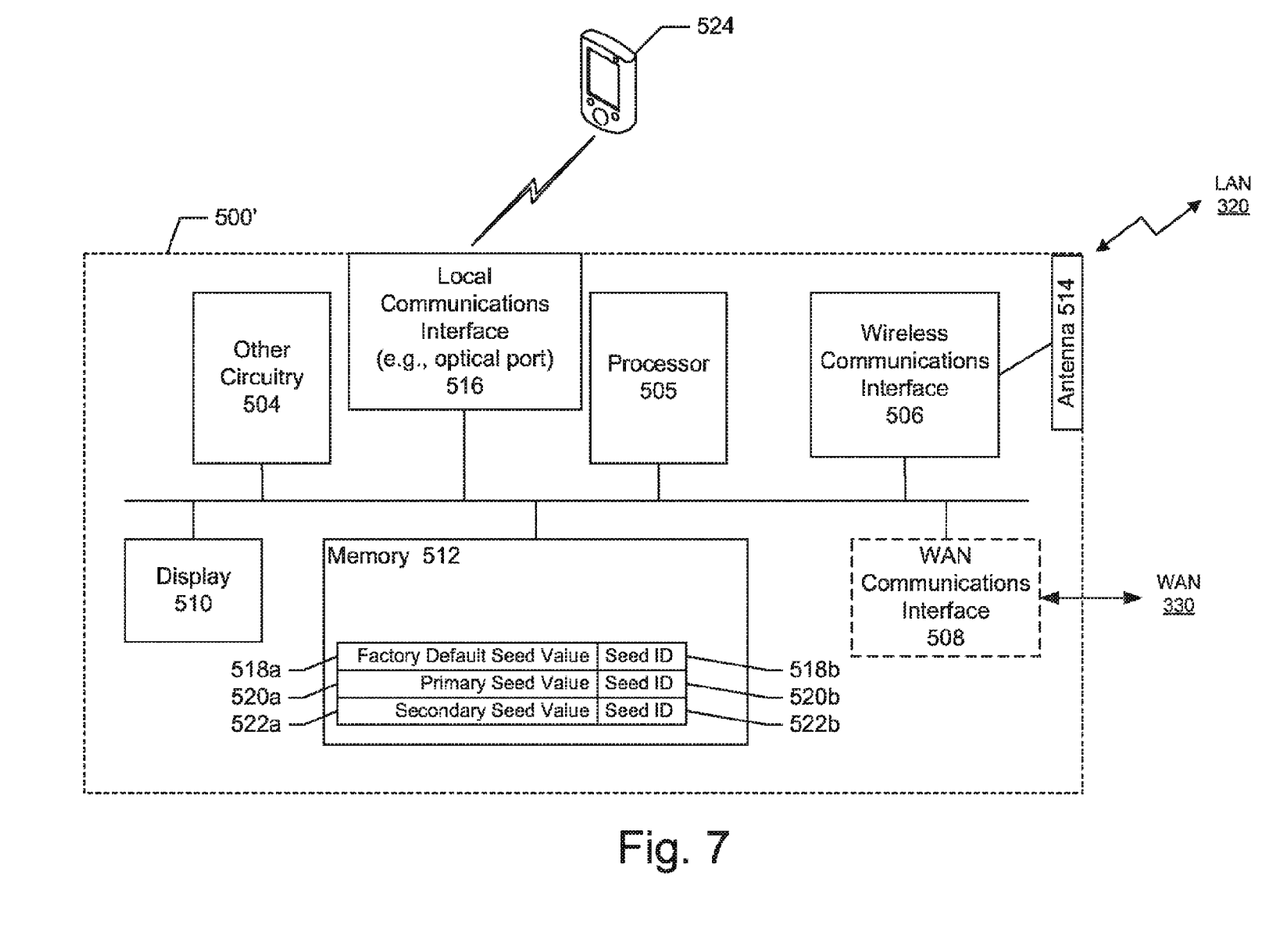
FIG. 7 is a block diagram of an alternative embodiment of a node of the system illustrated in FIG. 3, which node implements a primary key and a secondary key for secure communications in accordance with the methods and apparatus described herein.

FIG. 7 is a block diagram illustrating further details of an embodiment of a node 500' of a wireless network, such as a meter 114 of the metering system described above and illustrated in FIGS. 1-6, which may employ the primary and secondary key concept described herein. As shown, in one embodiment, the node may comprise many of the same components as the node 500 of FIG. 5, including a central processing unit or processor 505, such as a microprocessor, microcontroller or the like, a memory 512 in which to store data, and a display 510. The node 500' may also include other circuitry 504 specific to its particular function. For example, where the node 500' is a metering device, such as one of the meters 114 of FIGS. 1 and 2, the other circuitry 504 may comprise metering circuitry. The node 500' may further comprise a wireless communications interface 506 and an antenna 514 for communicating wirelessly with other nodes on the LAN 320. As one example, the wireless communications interface may comprise a CC1110 chip available from Texas Instruments, Inc.

In the case of a node, such as node 306, that serves as a master node, the node 500' may also include a WAN communications interface 508 for communicating over the WAN 330 with, for example, the seed server 308. The WAN communications interface 508 may comprise any suitable circuitry for communicating over the particular WAN employed, such as wireless communications circuitry, circuitry that implements a network protocol such as Ethernet, a telephone modem, or the like.

In addition to the wireless communications interface 506 via which the node 500' may communicate wirelessly over the wireless network (e.g. LAN 320), the node 500' may further comprise another communications interface 516 via which the node 500' may communicate with sources local to the node. For example, in the case of a node that is one of a plurality of metering devices in a metering system like that described above and illustrated in FIGS. 1-2, the communications interface 516 may comprise an optical communications port commonly found on such metering devices. Alternatively, the communications interface 516 may comprise an interface implemented in the form of an option board (not shown) installed within the node 500', where the option board implements a particular communications interface. For example, the option board may implement an RS-232 serial data interface. Still further, the communications interface 516 may implement another wireless communications interface that may be different than the wireless communications interface 506. A technician may use a field tool, such as a portable hand-held programming device 524, to communicate locally with the node 500' via the communications interface 516. In yet another embodiment, the technician may be able to communicate wirelessly with the node 500' via the node's wireless communications interface 506, albeit without involving the wireless network (LAN) 320.

In accordance with one embodiment of the methods and apparatus described herein, the node 500' has both a primary key and a secondary key. In addition, the node 500' may also have a default key, which may be a key installed in the meter at some point during manufacturing of the node or installed by the entity (e.g., a utility) during deployment of the node. In any event, the seed server 308 may be aware of, and store its own copy of, this default key to enable it to be used for encrypting and decrypting messages, if necessary, communicated between the node 500' and a master node, such as master node 306. The primary key, secondary key, and/or default key may be stored in the memory 512 of the node 500'.

As described above in connection with the exemplary key management system, in one embodiment, instead of storing the actual primary, secondary and default keys at the node, the node may instead store a primary seed value 520a, a secondary seed value 522a, and a default seed value 518a. The node may then generate the primary key, the secondary key and/or the default key locally in the manner described above based on a combination of the particular seed value with the unique identifier of the node 500' on the wireless network. As used herein and in the claims, the term "key" is meant to encompass both embodiments in which the actual primary, secondary and/or default key is maintained at the node and embodiments wherein those key values are generated locally based on the combination of a corresponding seed value and the node's unique identifier. As further illustrated in FIG. 7, and in the same manner as described above with respect to the key management system illustrated in FIGS. 3-6, each of the seed values, 520a, 522a and 518a may have a respective seed identifier 520b, 522b and 518b that is also stored in memory 512.

Figure 8:
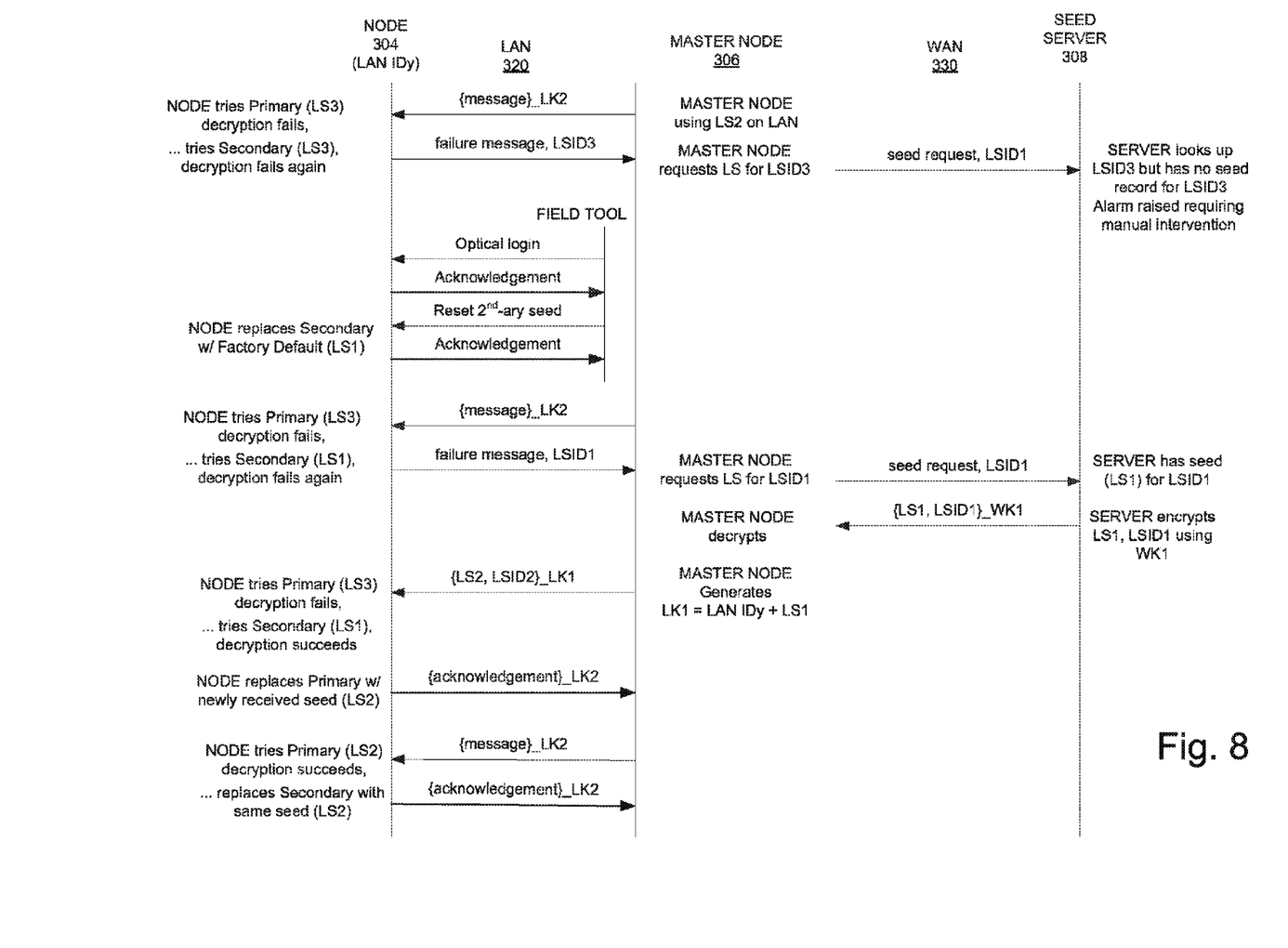
FIG. 8 is a block diagram of a method in which a primary key and a secondary key may be used for secure communications.

FIG. 8 is a diagram illustrating one embodiment of a method of operation of the node 500'. In this example, the node 500' has been used to implement the exemplary node 304 of FIG. 3. For purposes of illustration, and with reference to both FIG. 3 and FIG. 8, assume that the master node 306 is presently using seed value LS2 to generate cryptographic keys for communicating with the nodes of the LAN 320. For example, when encrypting a message to node 304, the master node 306 will generate a cryptographic key (LK2) by combining the LAN identifier of node 304 (LAN IDy) with seed value LS2. As used in the drawings, the notation "{message}_LK2" in FIG. 8 indicates that the "message" within the brackets "{ }" is encrypted using key "LK2." The message may be encrypted using any suitable encryption algorithm, such as the DES encryption algorithm.

The encrypted message is then transmitted to node 304. Assume, however, that node 304 presently stores (and uses for generating its cryptographic key) a primary seed value LS3 and its seed identifier LSID3. Assume also that the node 304 stores the same seed value LS3 and its seed identifier LSID3 as the node's secondary seed value as well. Node 304 will generate its unique primary encryption key (LK3) by combining its LAN IDy with LS3. Decryption will fail because LK3 will not match LK2, since different seed values were used to generate them. The node 304 will then attempt to decrypt the message using its secondary key (generated by combining its LAN IDy with its secondary seed value—also LS3). The secondary key LK3, which is the same as the primary key, will also fail to decrypt the message.

At this point, a technician may be dispatched to the location of node 304. Assume that the technician is able to communicate with the node 304 using a field tool, such as programming device 524, via the communications interface 516, which may comprise an optical port interface. As shown in FIG. 8, the technician may use the field tool to login to the node 304 via the interface 516. After receiving an acknowledgment, the field tool may transmit a command to the node to change the secondary encryption key, and more particularly in this embodiment, the secondary seed value from which the secondary key is generated. The node will then respond by changing the secondary encryption key (or secondary seed value). In an embodiment, the secondary key (or seed value) may be changed to a value supplied by the technician via the field tool. Alternatively, and in this example, the command to change the secondary key (or seed value) causes the node 304 to retrieve a default key (or seed value) stored securely within the node 304, such as the default seed value 518a illustrated in FIG. 5. As mentioned above, the default seed value may be installed or stored in the node 304 at the time of manufacturer or at the time of deployment by the entity operating the communications network. Preferably, whatever value to which the secondary key (or seed) is changed is one that is known by the master node 306 and/or seed server 308. In the example shown, assume that the factory default seed value to which the secondary seed value is changed is seed value LS1.

In an embodiment, once the secondary seed value has been changed (e.g., to LS1), the node 304 may again attempt to decrypt the encrypted message received from the master node 306. But again, because that message was encrypted with LK2 (the LAN IDy or node 304 combined with seed value LS2), the attempts to decrypt using both the node's primary key (LK3) and now secondary key (LK1) will again fail. At this point, the node 304 may use the new secondary key (i.e., its new secondary seed value and seed identifier) to obtain a new primary key (or seed value) in accordance with whatever key recovery mechanism the communications system may employ. In the remainder of this example, it is assumed that the key recovery mechanism employed by the communications network is the one described above and illustrated in FIG. 4.

After the second failure to decrypt the message using the primary key LK3 and new secondary key LK1, the node 304 may send a failure notification to the master node 306, which includes the seed identifier LSID1 for the new secondary seed value LS1. The seed value itself is not transmitted. Assuming that the master node 306 does not already have the seed value for seed identifier LSID1 in its table 318, the master node 306 will send a seed request to the seed server 308 that includes the seed identifier LSID1.

Assuming that the master node 306 and the server 308 are using WAN seed value WS1 (and associated identifier WSID1) for communications over the WAN, the server will send the seed value LS1 for seed identifier LSID1 back to the master node 306 encrypted using a cryptographic key (WK1) generated by combining the WAN identifier (WAN IDx) of the master node 306 with WAN seed value WS1. The master node 306 will decrypt the message to recover the LAN seed value LS1 and will store it in its table 318 associated with its respective seed identifier LSID1.

The master node 306 is then able to generate the new secondary key LK1 of the node 304 by combining the LAN identifier (LAN IDy) of node 304 with LS1. The master node then uses that cryptographic key LK1 to encrypt the seed value LS2 and seed identifier LSID2 (which the master node 306 may presently be using to create unique cryptographic keys for all of the nodes of the network). The master node 306 may then transmit the encrypted seed value LS2 and seed identifier LSID2 (i.e, {LS2, LSID2}_LK1) to the node 304.

At this point, the node 304 may again attempt to decrypt the new message first using the primary key LK3, which will fail. The node 304 will then attempt to decrypt the message using its new secondary key LK1 (generated by combining LAN IDy and LS1). Because the master node 306 used LK1 to encrypt the message, this time the decryption will succeed. The node 304 may then retrieve the unencrypted seed value LS2 (and its identifier LSID2) and store the new values as the new primary seed (and hence new primary key). It may also send an acknowledgment back to the master node 306, which may respond by again sending the original encrypted message ({message}_LK2) to the node 304. Because the new primary key LK2 matches the key LK2 used by the master node 306 to encrypt the message, decryption of the message will succeed. Having successfully decrypted the message using its primary key, the node 304 may then replace its secondary key a second time with the new primary key LK2, so that both the primary key and secondary key again match. In another embodiment, the node 304 may copy the new primary key LK2 to the secondary key immediately upon recite, i.e., without first waiting for a successful decryption as in the example of FIG. 8.

Thus, by providing the ability to set/change the secondary key on the node 304, secure communications may be re-established between the master node 306 and the remote node 304 in the event that the primary key fails to provide successful decryption of information transmitted to the remote node. Once secure communications are reestablished using the secondary key, then the normal key recovery process of the system can be used to update the primary key remotely (encrypted), thereby allowing re-alignment of the primary key between the master and the remote node.

As is apparent from the above, all or portions of the various systems, methods, and aspects of the present invention may be embodied in hardware, software, or a combination of both.

When embodied in software, the methods and apparatus of the present invention, or certain aspects or portions thereof, may be embodied in the form of program code (i.e., computer executable instructions). This program code may be stored on a computer-readable medium, such as a magnetic, electrical, or optical storage medium, including without limitation, a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language. When implemented on a general-purpose processor, the program code may combine with the processor to provide a unique apparatus that operates analogously to specific logic circuits.

As the foregoing illustrates, the present invention is directed to a novel key management method, system and apparatus employing primary and secondary encryption keys. Changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A node of a wireless communications network, the node being remote from a master node of the wireless communications network, the master node and the node communicating via the wireless communications network, the node comprising:

a wireless communications interface for communicating via the wireless communications network;

a primary key for encrypting and decrypting messages in accordance with a symmetric key encryption algorithm;

a secondary key for encrypting and decrypting messages in accordance with the symmetric key encryption algorithm; and a processor that operates to:

receive an encrypted message from the master node via the wireless communications interface;

attempt to decrypt the received encrypted message using the primary key;

if the attempt to decrypt the received encrypted message using the primary key fails, attempt to decrypt the received encrypted message using the secondary key; and if the attempt to decrypt the received encrypted message using the secondary key fails, receive a command transmitted by a source local to the node to change the secondary key;

change the secondary key in response to the command; and use the changed secondary key to perform encrypted communications with the master node via the wireless communications interface to obtain a new primary key from the master node, wherein the processor locally generates the primary key based at least in part on a combination of a primary seed value and an identifier that uniquely identifies the node on the wireless communications network, and wherein the processor locally generates the secondary key based at least in part on a combination of a secondary seed value and the identifier that uniquely identifies the node on the wireless communications network, and wherein the primary seed value and the secondary seed value are stored locally within a memory of the node.

2. The node recited in claim 1, wherein the node does not permit the primary key to be changed other than by a communication from the master node.

3. The node recited in claim 1, wherein the processor permits the source local to the node to change the secondary key, but not the primary key.

4. The node recited in claim 1, wherein changing the secondary key comprises changing the secondary seed value.

5. The node recited in claim 4, wherein each seed value has a corresponding unique seed identifier, and wherein the processor obtains a new primary key by obtaining a new primary seed value, and wherein the new primary seed value is obtained by: (i) transmitting the seed identifier corresponding to the changed secondary seed value to the master node; (ii) receiving from the master node a new primary seed value encrypted using a copy generated by the master node of the changed secondary key, the master node having generated the copy of the changed secondary key based on its receipt from the node of the seed identifier corresponding to the changed secondary seed value; (iii) decrypting the encrypted new primary seed value using the changed secondary key to retrieve the new primary seed value, the new primary key being generated based on a combination of the retrieved new primary seed value and the unique identifier of the node on the wireless communications network.

6. The node recited in claim 1, wherein the processor changes the secondary key by replacing the secondary key with a default key stored within the node, the master node having a copy of the same default key.

7. The node recited in claim 1, wherein after the obtaining the new primary key from the master node, the processor replaces the original primary key with the new primary key.

8. The node recited in claim 1, wherein the processor further replaces the changed secondary key with the new primary key, such that the secondary key and the primary key then match.

9. A method for use in a wireless communications network comprising a master node and a first node remote from the master node, the first node and the master node communicating plurality via the wireless communications network, the first node having a wireless communications interface for communicating via the wireless communications network, a primary key for encrypting and decrypting messages in accordance with a symmetric key encryption algorithm, and a secondary key for encrypting and decrypting messages in accordance with the symmetric key encryption algorithm, the method comprising:

locally generating the primary key based at least in part on a combination of a primary seed value and an identifier that uniquely identifies the first node on the wireless communications network, and locally generating the secondary key based at least in part on a combination of a secondary seed value and the identifier that uniquely identifies the first node on the wireless communications network;

storing the primary seed value and the secondary seed value within a memory of the first node;

receiving an encrypted message from the master node via the wireless communications interface;

attempting to decrypt the received encrypted message using the primary key;

if the attempt to decrypt the received encrypted message using the primary key fails, attempting to decrypt the received encrypted message using the secondary key;

if the attempt to decrypt the received encrypted message using the secondary key fails, receiving a command transmitted by a source local to the first node to change the secondary key and changing the secondary key in response to the command; and using the changed secondary key to perform encrypted communications with the master node via the wireless communications interface to obtain a new primary key from the master node.

10. The method recited in claim 9, further comprising not permitting the primary key to be changed other than by a communication from the master node.

11. The method recited in claim 9, further comprising permitting the source local to the first node to change the secondary key, but not the primary key.

12. The method recited in claim 9, wherein changing the secondary key comprises changing the secondary seed value.

13. The method recited in claim 12, wherein each seed value has a corresponding unique seed identifier, and wherein obtaining a new primary key comprises obtaining a new primary seed value, and wherein obtaining the new primary seed value comprises (i) transmitting the seed identifier corresponding to the changed secondary seed value to the master node; (ii) receiving from the master node a new primary seed value encrypted using a copy generated by the master node of the changed secondary key, the master node having generated the copy of the changed secondary key based on its receipt from the first node of the seed identifier corresponding to the changed secondary seed value; and (iii) decrypting the encrypted new primary seed value using the changed secondary key to retrieve the new primary seed value, the new primary key being generated based on a combination of the retrieved new primary seed value and the unique identifier of the first node on the wireless communications network.

14. The method recited in claim 9, wherein changing the secondary key comprises replacing the secondary key with a default key stored within the first node, the master node having a copy of the same default key.

15. The method recited in claim 9, further comprising replacing the original primary key with the new primary key after obtaining the new primary key from the master node.

16. The method recited in claim 9, further comprising replacing the changed secondary key with the new primary key, such that the secondary key and the primary key then match.

* * * * *

UNITED STATES PATENT AND TRADEMARK OFFICE
CERTIFICATE OF CORRECTION

| | | |
|---|---|---|
| PATENT NO. | : 8,509,438 B2 | |
| APPLICATION NO. | : 12/696724 | |
| DATED | : August 13, 2013 | |
| INVENTOR(S) | : Jeff D. McCullough | |

It is certified that error appears in the above-identified patent and that said Letters Patent is hereby corrected as shown below:

In the Claims

COL. 15, line 48 [CLAIM 9], DELETE "plurality"

Signed and Sealed this
Fifteenth Day of October, 2013

Teresa Stanek Rea
*Deputy Director of the United States Patent and Trademark Office*